United States Patent Office 3,352,688
Patented Nov. 14, 1967

3,352,688
BAKE STABLE BAKERY FILLING
PRODUCT AND METHOD
Blase T. Messina, Chicago, Ill., assignor to Kelco Company, San Diego, Calif., a corporation of Delaware
No Drawing. Filed July 13, 1966, Ser. No. 564,748
28 Claims. (Cl. 99—131)

This application is a continuation-in-part of my application entitled, "Bake Stable Bakery Filling Product and Method," filed May 5, 1965, Ser. No. 453,490, and now abandoned, which is in turn a continuation-in-part of my application entitled, "Bakery Filling Product and Method," filed Aug. 9, 1961, Ser. No. 130,269, and now abandoned.

This invention relates to fillings used by the baking industry in their baked goods and more particularly to an improved bakery filling method and product comprising a gel filling including an alginate in combination with guar gum, locust bean gum, or starch.

In the baking industry it is known to use various fillings in connection with certain baked goods. Such fillings comprise fruit based or flavored fillings, cream based or textured fillings, nuts, icings, or almost any conceivable edible product in one form or another. Fillings of this kind are applied in some instances to the unbaked dough after which they undergo subsequent baking. They are also applied to the hot baked products shortly after they have been removed from the oven. In other instances, certain fillings are applied only to the baked product after it has been cooled and in some instances to such products that require subsequent refrigeration.

In accordance with the present invention, I have developed fillings for bakery goods that may be included in unbaked goods and will withstand baking temperatures. These fillings are sufficiently stable to be used with hot baked products shortly after they have been removed from the oven.

Moreover, my novel fillings are extraordinarily freeze-thaw resistant. That is, gels in accordance with my invention may be frozen and maintained at a very low temperature, as low for example as −20° F., for extended periods, and then thawed to room temperature, without impairing the qualities of the gel or causing separation or the like. Thus, I have produced an edible gel type filling which may be included in an unbaked pastry article, subsequently baked, subsequent frozen, and subsequently thawed out, either by allowing to stand at room temperature or even by reheating in an oven, all the while having a gel of proper physical characteristics, without either melting at the high temperature involved, or being damaged by having been frozen.

Generally speaking, and in accordance with an illustrative embodiment of my invention, I form a water based gel by adding to water or to a water-fruit juice or water fruit puree mixture from about 0.25 to about 0.75% of sodium alginate based on the weight of the finished gel, together with a salt whose cations form a water-insoluble salt with alginic acid. The salt is preferably a calcium salt, and best is a calcium phosphate. Also, I may include an alkali metal salt of a weak acid, such as sodium pyrophosphate, sodium tetraphosphate, sodium tripolyphosphate, sodium hexametaphosphate or a like molecularly dehydrated phosphate, sodium citrate, sodium acetate, sodium adipate, and the like, together with a weak edible acid, of which I have found the best to be adipic acid. Alternative weak edible acids are fumaric acid, citric acid, malic acid or phosphoric acid. I also include in the gel from about 0.20 to about 3.0% and preferably 0.20 to 0.75% of guar gum, locust bean gum or starch. The starch preferably has been pre-gelatinized.

The salt whose cations form a water-insoluble salt with alginic acid may be present at a concentration from about 0.05% to about 0.25% and preferably 0.05 to 0.1% by weight of the finished gel, and the alkali metal salt of a weak acid, e.g., an alkali metal phosphate, may be present in an amount from about 0.10% to about 0.50% and preferably about 0.10 to about 0.25% by weight of the finished gel. The weak edible acid, e.g., adipic acid, is preferably present at a concentration ranging from about 0.25% to about 1.00% by weight of the finished gel.

Since a bakery filling is generally sweetened to enhance its taste properties, my novel fillings can, of course, contain a sweetener such as sugar. If desired, sugar may be present in an amount such as about 20 to about 60% of the finished bakery filling.

As described above, most of the finished gel product is composed of the aqueous base, including the water, fruit juices, fruit puree and added sweetener. Thus, the percentages expressed above are essentially the same, whether expressed as a percent of the finished gel product or as a percent of the aqueous base.

In the use of my invention, the various ingredients can be packaged as a dry mix which, when added to an equeous base, will form a heat and freeze stable gel type bakery filling. In discussing the dry mix, it is convenient to speak of the ingredients in terms of parts, which bear the same relation to each other as the percentages set forth above. Expressed in parts, by weight, the dry mix may contain from about 0.25 to about 0.75 part of a water-soluble alginate, such as sodium alginate, potassium adginate, or ammonium alginate, from about 0.20 to about 3.0 and preferably about 0.20 to about 0.75 part of guar gum, locust bean gum, or starch, from about 0.05 to about 0.25 and preferably about 0.05 to about 0.1 part of a salt whose cations form a water-insoluble salt with alginic acid, from about 0.10 to about 0.50 and preferably about 0.10 to about 0.25 part of an alkali metal salt of a weak acid, e.g., sodium tripolyphosphate, sodium hexametaphosphate, and the like, and from about 0.25 to about 1.0 part of a weak edible acid such as adiptic acid. Also included in a dry mix can, of course, be a sweetener such as sugar, various flavoring agents, and the like.

Except for the presence of guar gum, locust bean gum or starch as described, the other ingredients form edible gels of a type previously known and disclosed in great detail by Steiner in United States Patent No. 2,441,729, the entire disclosure of which is incorporated herein by reference. However, useful as the prior art alginate gels are, they are capable of substantial improvement because they suffer from the disadvantage that they are heat liquefiable, at least at temperatures ordinarily encountered in baking pastry and like goods. While guar gum, locust bean gum or starch have found some uses in the food industry, they do not ordinarily produce gels of a type considered desirable or suitable for baked goods. I consider it very surprising, therefore, that by combining an alginate, with guar gum, locust bean gum, or starch in edible gel compositions of the kind under consideration, I simultaneously obtain a heat- and freeze-resistant gel which at the same time is free from the "gumminess" ordinarily imparted by a gum. It is indeed possible with this invention to make a very light-bodied gel, such as is customary for use in jelly-filled doughnuts and jelly rolls, and still retain the heat-resistant property. Even when a firmer gel is made in accordance with my invention, such as is used as a topping for cakes, it is possible to cut a slice of the so-topped cake without having a gel of such gummy character that it makes cutting difficult. Thus, I combine a firmness of gel with easy fracturing and cutting qualities, which again is a considerable advance in the art .

I will now give some working examples illustrating further my inventive compositions:

*Example I*

|  | Percent |
|---|---|
| (1) Sodium alginate | 0.549 |
| (2) Tricalcium phosphate | 0.064 |
| (3) Sodium hexametaphosphate | 0.183 |
| (4) Guar gum | 0.502 |
| (5) Sugar | 13.620 |
| (6) Water | 50.700 |
| (7) Sugar | 27.400 |
| (8) Fruit juice, e.g., pineapple juice | 1.825 |
| (9) Color-flavor—optional | |
| (10) Adipic acid | 0.587 |
| (11) Water | 4.570 |
|  | 100.000 |

Dry blend ingredients Nos. 1–5. Add to water (No. 6) under agitation. Heat to about 170° F. and add Nos. 7, 8 and 9 while continuing agitation. Hold at 170° F. for about 5 minutes. Cool to 160° F. Add No. 10 slurried in No. 11. Mix 2–4 minutes longer and package.

The composition set forth above has very good heating and freezing resistance. It will be evident that the particular choice of pineapple flavoring is optional and other fruit juices, fruit pulp, fruit purees, and the like, may be used such as raspberry juice and pulp, Concord grape juice, and the like.

*Example II*

(Cold process—36.5% solids)

|  | Percent |
|---|---|
| (1) Sodium alginate | 4.25 |
| (2) Guar gum | 3.55 |
| (3) Sodium hexametaphosphate | 2.65 |
| (4) Dicalcium phosphate | 1.40 |
| (5) Adipic acid | 8.85 |
| (6) Flavor-color-preservatives | 2.90 |
| (7) Sugar | 76.50 |
|  | 100.00 |

Add 1 oz. of above, blend to one cup of water and mix vigorously for one minute. Add 4 ozs. of sugar and continue stirring for 10–20 seconds. Package. If desired, the 4 ozs. of sugar and 1 oz. of dry mix may be preblended prior to admixing with the water.

*Example III*

Example II is carried out except 5 ozs. of sugar are added in place of 4 ozs. of sugar.

*Example IV*

When Example I was repeated using 0.50% of locust bean gum in lieu of the 0.502% of guar gum, a satisfactory bakery filling was obtained. This filling was aged for 24 hours after which it was subjected to a freeze-thaw cycle and placed on an aluminum pie plate. It was then baked at 425° F. for 12 minutes and was observed for stability. It was found to have fair-good bake stability in that only slight sag was observed in the gel as a result of this treatment.

*Example V*

Example I was again repeated using 3.00% of an instant starch (Instant Clearjel) in lieu of the 0.502% of guar gum. The gel filling produced was aged for 24 hours and then subjected to a freeze-thaw cycle and placed on an aluminum pie plate. The sample was then baked at 425° F. for 12 minutes. It was found that the sample had good freeze-thaw stability and good bake stability. No change was observed in the gel as a result of the treatment.

*Example VI*

A sample was made up according to Example I but which contained 0.50% of guar gum. The gel filling was subjected to a freeze-thaw cycle after aging for 24 hours. It was then placed on an aluminum pie plate and baked at 425° F. for 12 minutes and observed for stability. It was found that this gel had good freeze-thaw stability and good bake stability. No change was observed in the gel as a result of the baking test.

The results of Examples IV, V and VI show the surprising improvement in the baking stability of products prepared according to my invention. The gel containing locust bean gum (Example IV) had a bake stability which was slightly less than that of the products containing guar gum or an instant starch as in Examples V and VI. However, all of the products were greatly superior to a test gel prepared according to Example I which did not contain guar gum, locust bean gum, or a starch as required by the invention. The test gel was found to have poor bake stability and it liquefied as a result of the baking treatment.

*Example VII*

In a still further test, Example I was repeated with the exception that 0.50% of sodium carboxymethyl cellulose was employed in lieu of the 0.502% of guar gum. After aging for 24 hours, the gel was subjected to a freeze-thaw cycle and then placed on an aluminum pie plate. Following this, the sample was baked at 425° F. for 12 minutes and observed for stability. It was found that the gel had good freeze-thaw stability but had poor bake stability. It was observed that the gel containing the carboxymethyl cellulose liquefied when subjected to the baking treatment.

As shown above, the gel sample containing carboxymethyl cellulose in Example VII was no better than the test gel which contained no guar gum, locust bean gum, or starch. In each case, the gel sample had poor bake stability and liquefied when subjected to the baking test.

While my invention has been described by the aid of specific examples and specific temperatures, proportions, processing conditions, and the like, it will be evident that many variations in ingredients, proportions, reaction conditions and the like are possible, within the scope of my invention as defined by the claims which follow.

I claim:

1. The process of producing a new and useful food composition comprising forming with a liquid base including water, sugar, and flavoring, a water-insoluble alginate gel normally subject to heat liquefaction in the presence of a sufficient quantity of a water-dispersible material selected from the class consisting of guar gum and locust bean gum, to inhibit the heat liquefaction of said alginate gel.

2. The process of producing a new and useful edible, heat stable gel comprising forming with a liquid base of water, sugar, and flavoring, a water-insoluble alginate gel normally subject to heat liquefaction in the presence of a sufficient quantity of guar gum to inhibit the normal heat liquefaction of said alginate gel.

3. A composition suitable for producing an edible, aqueous, heat stable gel when added to an aqueous base comprising as essential ingredients on a weight basis from about 0.25 to about 0.75 part of sodium alginate, a sufficient quantity of a calcium salt which will form a water-insoluble salt with alginic acid, and of an alkali metal salt of a weak acid, to promote the formation of a water-insoluble alginate gel from said sodium alginate, and from about 0.20 to about 3.0 parts of a water-dispersible material selected from the class consisting of guar gum and locust bean gum.

4. The composition of claim 3 containing sufficient sugar to produce a sweetened gel.

5. The composition of claim 3 wherein said water-dispersible material is guar gum.

6. The composition of claim 3 wherein said water-dispersible material is locust bean gum.

7. The composition of claim 3 wherein said water-dispersible material is present in an amount from about 0.20 to about 0.75 part.

8. The composition of claim 7 wherein said calcium salt is present in amount from about 0.05 to about 0.25 part.

9. The composition of claim 8 wherein said calcium salt is present in amount from about 0.05 to about 0.1 part.

10. The composition of claim 9 wherein said alkali metal salt of a weak acid is a molecularly dehydrated sodium phosphate which is present in an amount from about 0.01 to about 0.50 part.

11. The composition of claim 10 wherein said molecularly dehydrated sodium phosphate is present in an amount from about 0.10 to about 0.25 part.

12. The composition of claim 11 wherein said composition contains also a weak edible acid in amount from about 0.25 to about 1.00 part.

13. A composition suitable for producing an edible, aqueous, heat stable gel when added to an aqueous base comprising from about 0.25 to about 0.75 part of a water-soluble alginate, from about 0.05 to about 0.1 part of a calcium salt which forms a water-insoluble salt with alginic acid, from about 0.10 to about 0.25 part of a molecularly dehydrated sodium phosphate, from about 0.25 to about 1.00 part of a weak edible acid, and from about 0.20 to about 0.75 part of a water-dispersible material selected from the class consisting of guar gum, and locust bean gum.

14. The composition of claim 13 wherein said weak edible acid is adipic acid.

15. The composition of claim 13 wherein said water-soluble alginate is sodium alginate.

16. An edible, aqueous, heat stable gel comprising from about 0.25 to about 0.75% of a water-soluble alginate, a sufficient quantity of a calcium salt to form a water-insoluble salt with alginic acid, and a sufficient quantity of an alkali metal salt of a weak acid to promote the formation of a water-insoluble alginate gel from said sodium alginate, from about 0.20 to about 3.0% of a water-dispersible material selected from the class consisting of guar gum, and locust bean gum, and an aqueous base.

17. The product of claim 16 wherein said water-dispersible material is present in an amount from about 0.20 to about 0.75% by weight.

18. The composition of claim 17 wherein said calcium salt is present in an amount ranging from about 0.05 to about 0.1%, and said alkali metal salt of a weak acid is a molecularly dehydrated sodium phosphate which is present in an amount from about 0.1 to about 0.25%.

19. A composition suitable for producing an edible, aqueous, heat stable gel by admixture with an aqueous base comprising from about 0.25 to about 0.75 part of sodium alginate, from about 0.05 to about 0.1 part of a calcium salt selected from the class consisting of dicalcium phosphate and tricalcium phosphate, from about 0.10 to about 0.25 part of a molecularly dehydrated sodium phosphate, from about 0.25 to about 1.00 part of a weak edible acid, and from about 0.20 to about 0.75 part of a water-dispersible material selected from the class consisting of guar gum, and locust bean gum.

20. The composition of claim 7 wherein said water-dispersible material is guar gum.

21. The composition of claim 7 wherein said water-dispersible material is locust bean gum.

22. The composition of claim 13 wherein said water-dispersible material is guar gum.

23. The composition of claim 13 wherein said water-dispersible material is locust bean gum.

24. The composition of claim 16 wherein said water-dispersible material is guar gum.

25. The composition of claim 16 wherein said water-dispersible material is locust bean gum.

26. The process of claim 1 wherein said water-dispersible material is locust bean gum.

27. The composition of claim 19 wherein said water-dispersible material is guar gum.

28. The composition of claim 19 wherein said water-dispersible material is locust bean gum.

References Cited

UNITED STATES PATENTS

| | | | |
|---|---|---|---|
| 2,563,996 | 8/1951 | Edgar et al. | 99—131 X |
| 2,786,763 | 3/1957 | Rivoche | 99—131 |
| 2,918,375 | 12/1959 | Gibsen | 99—131 |
| 2,935,409 | 5/1960 | McDowell et al. | 99—139 X |
| 2,992,925 | 7/1961 | Green et al. | 99—131 |
| 3,060,032 | 10/1962 | Glicksman | 99—131 |

A. LOUIS MONACELL, *Primary Examiner.*

J. M. HUNTER, *Assistant Examiner.*